United States Patent Office 3,663,653
Patented May 16, 1972

3,663,653
POLYTETRAHYDROFURAN MODIFIED BLOCK COPOLYESTER THERMOPLASTIC MOLDING COMPOSITIONS
Helmut Frohlich, Wilmington, Del., and Ludwig Brinkman, Frankfurt am Main, Germany, assignors to Farbwerke Hoechst Aktiengesellschaft vormals Meister Lucius & Bruning, Frankfurt am Main, Germany
No Drawing. Filed July 2, 1969, Ser. No. 838,670
Claims priority, application Germany, July 9, 1968, P 17 70 823.5
Int. Cl. C08g *39/10, 49/04*
U.S. Cl. 260—860         9 Claims

ABSTRACT OF THE DISCLOSURE

Modified polyesters from aromatic dicarboxylic acids and aliphatic and/or cycloaliphatic diols, which contain from 0.5 to 15 percent by weight of polytetrahydrofuran blocks obtained from a polytetrahydrofurandiol having a molecular weight of from 300 to 5000 (hydroxyl number 375 to 22) as structural units. These modified polyesters are distinguished by a high crystallization speed and can be worked up in the thermoplastic range to yield dimensionally stable shaped articles.

---

The present invention relates to thermoplastic molding compositions from block copolyesters and to a process for their manufacture.

It has already been proposed to work up polyesters derived from aromatic dicarboxylic acids and aliphatic or cycloaliphatic diols by injection-molding into crystallized molded articles. In British patent specification 1,104,089 it has been proposed to admix finely divided solid inorganic substances to the polyethylene terephthalate to increase the crystallization speed of the injection-molded polyester mass in the mold. A high crystallinity ensures hardness, dimensional stability and stability in the mold even at elevated temperatures. This high crystallinity must be attained as rapidly as possible because the residence time in the mold during injection-molding is part of the molding period whose length is one of the factors determining the economy of the process. These periods are frequently too long even with high temperatures in the mold; the search for measures to further accelerate the process of crystallization, therefore, is an economic necessity.

Now we have found that modified polyesters from aromatic dicarboxylic acids and, optionally, an amount of up to 10% by weight of aliphatic dicarboxylic acids, and aliphatic and/or cycloaliphatc diols lend themselves with special advantage to the manufacture of molded articles by injection-molding when they have a content of from 0.5 to 15% by weight, preferably 0.8 to 10% by weight, of polytetrahydrofuran blocks as structural units, obtained from a polytetrahydrofurandiol having a molecular weight of from 300 to 5,000 (hydroxyl number 375 to 22). In this manner it is possible to work up the polyester injection molding masses within substantially shorter molding periods since the degree of crystallinity necessary for a high stability in the mold is attained more rapidly.

The products obtained by the process of the present invention are block copolyesters, the crystallization of the hard polyester segments being facilitated by the elastic polytetrahydrofuran segments.

The block copolyesters may be obtained in such a manner that in the reaction of the aromatic dicarboxylic acids or the derivatives thereof, preferably the methyl ester, with the aliphatic diols, there are added 0.5 to 15% by weight, preferably 0.8 to 10% by weight, of polytetrahydrofurandiol. The polytetrahydrofurandiol should have two hydroxyl terminal groups. This conversion and the polycondensation following thereafter are carried out with the conventional catalysts according to known methods.

Another possibility of preparing the block copolyesters of the invention consists in admixing the polytetrahydrofurandiol to the polyester melt. Owing to a reesterification reaction the polytetrahydrofuran blocks are bound to the polyester through their hydroxyl terminal groups.

The products obtained by either of the methods may then be granulated in the extruder and the granules may then be subjected to a post-condensation in the solid phase at elevated temperature under reduced pressure. The polytetrahydrofurandiol used should have a molecular weight within the range of from 300 to 5,000. This corresponds to a hydroxyl number of 375 to 22.

The polyethylene terephthalate is preferably used in the form of a linear saturated polyester of aromatic dicarboxylic acids and aliphatic diols. In addition to the terephthalic acid, there may also be used an amount of up to 10% by weight of other aromatic dicarboxylic acids, such as naphthalene dicarboxylic acid, or also aliphatic dicarboxylic acids such, for example, as adipic acid. It is likewise possible to modify the diol component within certain limits by the addition of an amount of up to 10% by weight of an aliphatic diol such, for example, as butanediol, or a cycloaliphatic diol such, for example, as 1,4-dimethylol cyclohexane.

In the preparation of the block copolyesters from the dicarboxylic acids or their methyl esters, and the diol, there may, fundamentally, be employed the catalysts generally known for the manufacture of polyesters. A compilation of useful catalysts is given in R. Wilfong, "Linear Polyesters," J. Pol. Sci. 1961, pages 385 through 140.

To attain a high molecular weight, the readily crystallizing block copolyesters may be subjected to a post-condensation in the solid phase. In this process, the granular product is highly condensed in a rotating apparatus in vacuo under a pressure below 1 mm. and at a temperature lying a little below the melting point of the block copolyester.

The polyesters of the invention should have a reduced specific viscosity (measured in a 1% solution in a 60:40 by weight mixture of phenol and tetrachloroethane at 25° C.) within the range of from 0.6 to 2.0 dl./g., preferably within the range of from 0.9 to 1.0 and 1.3 to 1.6 dl./g.

It has proved useful to add nucleating agents to the polyesters to further increase the speed of crystallization. As nucleating agents there may be used inert finely divided solid materials having a grain size below 5 microns or 2 microns, respectively, in an amount within the range of from 0.05 to 1% by weight, or 0.2 to 0.5% by weight, respectively, calculated on the polyester used, for example talcum or other silicates, such as china clay or aluminum silicates, furthermore metal oxides, such as magnesium oxide, aluminum oxide or antimony trioxide, or carbonates or fluorides and similar compounds.

Block copolyesters having the aforementioned viscosities may be worked up, preferably by injection-molding, into dimensionally stable articles which do not distort at temperatures above the second order transition temperature or when subjected to an annealing process owing to after-crystallization. For the purpose of comparison, an unmodified polyethylene terephthalate and a polyethylene terephthalate that had been modified according to the invention, both of which had the same reduced specific viscosity (measured in a 1% solution in a 60:40 by weight mixture of phenol and tetrachloroethane at 25° C.) were provided with an inorganic nucleating agent having a small particle size. On being injection-molded, the modified polyethylene terephthalate yielded dimensionally stable, well crystallized molded articles after considerably shorter residence times in the mold than is the case with the unmodified polyethylene terephthalate. With a rising residence time in the mold, the density of the injection-molded articles obtained from the block copolyester of the invention no longer increased. In contrast thereto, the density of the molded articles obtained from unmodified polyesters still increased with rising residence times in the mold. The density is a measure of the degree of crystallinity, that is to say it is directly proportional thereto. From Example 1 of the table following hereunder, it can be seen that injection-molded articles obtained from polyethylene terephthalate that had been modified with polytetrahydrofuran attain the highest degree of density already after a residence time in the mold of two seconds. Articles from unmodified polyethylene terephthalate, however, attain the highest degree of density only after a residence time in the mold of 15 seconds; thus there is required 7½ times the residence time in the mold for dimensionally stable articles having the highest degree of density and, consequently, the highest degree of crystallinity. The level of density of the block copolyester, which is fundamentally lower, is due to the content of polytetrahydrofuran blocks of lower density.

The nucleating agents used to attain a further increase of the crystallization speed may either be added during the condensation or the finished polyester granules may be coated with the nucleating agents.

It is advantageous to maintain the water content of the block copolyesters according to the invention during the work-up below 0.01% by weight to avoid possible degradation.

It is advantageous to apply to the polyester granules a coating consisting of an inert hydrophobic substance such, for example, as paraffin or wax. Thus the granules may be coated with, for example, 0.2% by weight of a wax (having a drop point of 56° C.) in a drum under nitrogen at 90° C. during the course of 5 hours.

The block copolyester masses according to the invention may be shaped in the thermoplastic range especially by injection-molding, and are suitable for the manufacture of shaped articles such as plates, sheets and films.

The block copolyester masses according to the invention are worked up at mold temperatures above their second order transition temperature. This ensures a high degree of crystallization of the block copolyesters to yield dimensionally stable injection-molded articles which are not subject to distortion.

The following examples serve to illustrate the invention but they are not intended to limit it thereto, the parts and percentages being by weight:

EXAMPLE 1

6000 parts of dimethyl terephthalate, 4980 parts of glycol and 125 parts of polytetrahydrofurandiol having a molecular weight of 1000 (hydroxyl number 109) were heated under nitrogen with 1.36 parts of manganese-II acetate as re-esterification catalyst. While stirring, 3600 ml. of a mixture of methanol and glycol were distilled off. The oil bath was maintained for 3 hours at a temperature of 170° C., for 2 hours at 190° C. and for 2½ hours at 250° C. Then 1.48 parts of $H_3PO_3$ were added to the reaction product to inactivate the manganese-II acetate and, after further stirring, 1.8 parts of germanium dioxide were added. After lowering the temperature of the oil bath to 200° C., a vacuum of 0.1 mm. was applied, while further amounts of glycol distilled off. After 2 hours, the temperature of the oil bath was raised to 215° C., after 1 hour it was raised to 250° C. and after a further 2 hours it was raised to 270° C. during the course of 5½ hours. The viscosity of the melt, which was stirred, increased continuously during this operation. After the polycondensation was complete, the block copolyester was allowed to cool, and was comminuted and ground. The product contained 2.2% of polytetrahydrofuran and had a reduced specific viscosity of 0.997 dl./g. (measured in a 1% solution in a 60:40 by weight mixture of phenol and tetrachloroethane at 25° C.). The granules were subjected to a post-condensation in the solid phase during the course of 17 hours at 235° C. under a reduced pressure of 0.1 mm. and attained the reduced specific viscosity of 1.467 dl./g. (measured in a 1% solution in a 60:40 by weight mixture of phenol and tetrachloroethane at 25° C.). For nucleation, the product was subjected to rotation together with 0.4% of talcum under nitrogen during the course of 2 hours at room temperature and during the course of a further 2 hours at 180° C., and the product was subjected to rotation with 0.2% of a wax (drop point 56° C.) during the course of 1 hour at room temperature and at 150° C., respectively. Then the block copolyester having a water content below 0.01% was injection-molded at 270° C. into sheets of dimensions 60 x 60 x 2 mm. The temperature of the mold was 140° C., the injection time 15 seconds, the dwell time 100 atmospheres, and the residence time in the mold was varied from 2 seconds to 30 seconds. Absolutely plane and dimensionally stable sheets of constant density were obtained with residence times in the mold of from 2 seconds onward; these sheets did not distort even after 4 hours annealing at 150° C.

Unmodified polyethylene terephthalate having a reduced specific viscosity of 1.462 dl./g. (measured in a 1% solution in a 60:40 by weight mixture of phenol and tetrachloroethane at 25° C.) was tested by way of comparison. In a manner analogous to that employed in the case of the block copolyester, this polyethylene terephthalate was nucleated with 0.4% of talcum, it was coated with 0.2% of the same wax and, with a water content of 0.01%, injection-molded into sheets under like conditions. With this product, dimensionally stable and plane sheets were only obtained with residence times in the mold of from 15 seconds onward. Also the constancy of density was only attained with a residence time in the mold of from 15 seconds onward. The table following hereunder shows the values obtained.

TABLE

| Residence time [1] | Polyethylene terephthalate with 2.2% of polytetrahydrofuran | | Unmodified polyethylene terephthalate | |
|---|---|---|---|---|
| | Quality of the sheets | Density (20° C.) | Quality of the sheets | Density (20° C.) |
| 2 | Absolutely plane | 1.366 | Distorted | 1.371 |
| 5 | do | 1.367 | Slightly distorted | 1.373 |
| 10 | do | 1.366 | Very slightly distorted | 1.374 |
| 15 | do | 1.366 | Absolutely plane | 1.377 |
| 30 | do | 1.366 | do | 1.377 |

[1] In the mold (seconds).

EXAMPLE 2

6000 parts of dimethyl terephthalate were reesterified with 4950 parts of ethylene glycol and 250 parts of polytetrahydrofurandiol having a molecular weight of 2000 (hydroxy number 53 to 59) with the addition of 1.36 parts of manganese-II acetate in a manner analogous to that described in Example 1. After 3600 ml. of a mixture of methanol and glycol had distilled off, 1.48 parts of phosphoric acid were added to inactivate the manganese-II acetate, and the polycondensation was carried out with 1.8 parts of germanium dioxide in a manner analogous to that described in the foregoing example. The block copolyester had a reduced specific viscosity of 0.835 dl./g. (measured in a 1% solution in a 60:40 by weight mixture of phenol and tetrachloroethane at 25° C.). The content of polytetrahydrofuran blocks amounted to 6.2%. After 16 hours after-condensation, the product had a reduced specific viscosity of 1.322 dl./g. (measured in a 1% solution in a 60:40 by weight mixture of phenol and tetrachloroethane at 25° C.). It was provided with 0.4% of talcum and 0.2% of wax. The block copolyester was injection-molded at 270° C. into sheets of dimensions of 60 x 60 x 2 mm. The temperature in the mold was 140° C., the injection time 15 seconds, and the dwell time 50 atmospheres. Perfectly plane sheets and constancy of density were obtained after a residence time in the mold of from 2 seconds onward.

Unmodified polyethylene terephthalate having a reduced specific viscosity of 1.340 dl./g. (measured in a 1% solution in a 60:40 by weight mixture of phenol and tetrachloroethane at 25° C.) was tested by way of comparison. On being injection-molded, this product yielded dimensionally stable, plane sheets of constant density only with residence times in the mold of 15 seconds.

We claim:

1. A modified block polyester of (A) an aromatic dicarboxylic acid and optionally, up to 10 percent by weight of an aliphatic dicarboxylic acid, (B) an aliphatic diol or a cycloaliphatic diol, and (C) from 0.5 to 15 percent by weight of polytetrahydrofurandiol, said polytetrahydrofurandiol having a molecular weight of from 300 to 5000 and a hydroxyl number of 375 to 22.

2. A modified polyester as claimed in claim 1, which contains terephthalic acid as the aromatic dicarboxylic acid.

3. A modified polyester as claimed in claim 1, which contains naphthalene dicarboxylic acid as the aromatic dicarboxylic acid.

4. A modified polyester as claimed in claim 1, which contains adipic acid as the aliphatic dicarboxylic acid.

5. A modified polyester as claimed in claim 1, which contains ethylene glycol as the aliphatic diol.

6. A modified polyester as claimed in claim 1, which contains in addition to ethylene glycol, an amount of up to 10 percent by weight of another aliphatic and/or cycloaliphatic diol selected from the group consisting of butanediol and 1,4-dimethylol cyclohexane.

7. A modified polyester as defined in claim 1, wherein the structural units of polytetrahydrofuran blocks are present in an amount of from 0.8 to 10 percent by weight.

8. A modified polyester as defined in claim 1, which additionally contains from 0.05 to 1 percent by weight, calculated on the weight of the polyester, of an inert, finely divided solid material having a particle size below 5 microns.

9. A molded article obtained by injection molding the modified polyester defined in claim 1.

References Cited

UNITED STATES PATENTS

| | | | |
|---|---|---|---|
| 2,811,512 | 10/1957 | Austin et al. | 260—75 |
| 2,842,512 | 10/1957 | Jezl | 260—30.4 |
| 3,020,253 | 2/1962 | Lukes | 260—30.4 |
| 3,470,212 | 9/1969 | Van Tuyle | 260—30.4 |
| 3,489,819 | 1/1970 | Busler | 260—860 |

OTHER REFERENCES

Wenner: "Dihydroxytetrahydrofurans," vol. 52:9216b.

Izumi et al.: "Resins," vol. 63:5850g, 1965.

The Quaker Oats Co., Technical Bulletin No. 150-A, February 1966, "QO Polyme."

The O.G. Defensive Publication: Seaton et al., Def. Pub. of Ser. No. 822,832, filed Apr. 9, 1969, published in 878 O.G. 239, on Sept. 8, 1970, Defensive Publication No. T878,004.

WILLIAM H. SHORT, Primary Examiner